United States Patent
Heth et al.

[11] 3,756,042
[45] Sept. 4, 1973

[54] SLIP CLUTCH WITH SIGNAL

[75] Inventors: Sherman C. Heth, Sturtevant; Sahag C. Akgulian; Knud H. Hoffmeyer, both of Racine; Dean A. Meyer, Caledonia, all of Wis.

[73] Assignee: Jacobsen Manufacturing Company, Racine, Wis.

[22] Filed: May 15, 1972

[21] Appl. No.: 253,635

[52] U.S. Cl. ............... 64/30 R, 64/30 C, 64/DIG. 1, 116/67 R, 192/30 W
[51] Int. Cl. .......................... F16d 7/02, G08b 3/02
[58] Field of Search .................. 192/30 W; 188/1 A; 81/52.5; 116/67 R, 25, 37, 73, 60; 64/DIG. 1, 30 R, 30 C

[56] References Cited
UNITED STATES PATENTS

| 1,596,132 | 8/1926 | Waite | 64/30 R |
| 1,789,862 | 1/1931 | Bricken | 192/30 W |
| 2,597,514 | 5/1952 | Nash | 64/30 C |
| 2,753,703 | 7/1956 | McIntyre | 64/30 R |
| 3,065,727 | 11/1962 | Warn | 116/60 |
| 1,240,889 | 9/1917 | Shepp | 116/60 |
| 2,939,301 | 6/1960 | Huddle | 64/30 R |

FOREIGN PATENTS OR APPLICATIONS

| 25,653 | 7/1931 | Netherlands | 64/30 R |

Primary Examiner—Allan D. Herrmann
Attorney—Arthur J. Hansmann

[57] ABSTRACT

A slip clutch with a signal for revealing when the clutch is slipping, and including a rotatable driving member and a rotatable driven member rotationally engaged with the driving member, and with the two members being rotatable relative to each other. A projection is carried on each of the two members, such that they hit against each other when the clutch is slipping, and one of the members is of a metallic material and cylindrically shaped so that it rings like a bell when its projection is being hit. A sphere is carried by the other member and is under the influence of centrifugal force to extend radially outwardly and hit the other member when the clutch is slipping and thereby create the audible signal.

8 Claims, 6 Drawing Figures

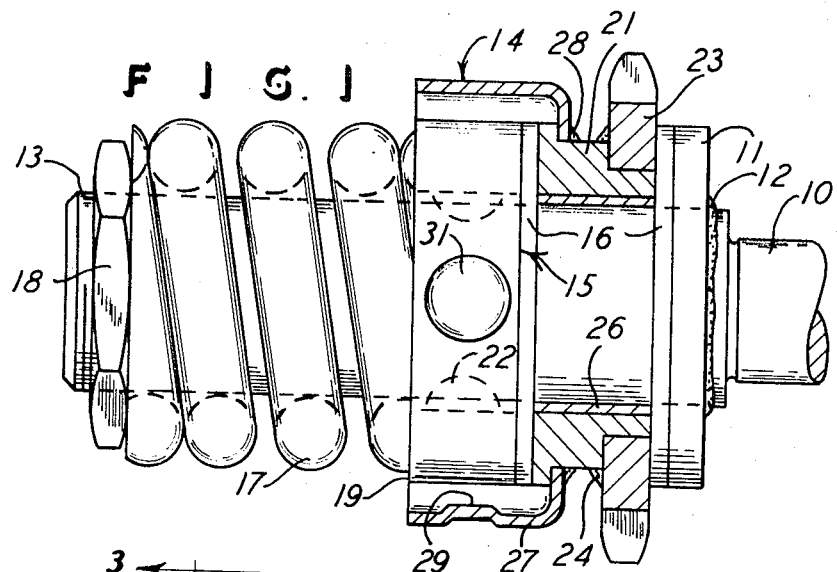
FIG. 1
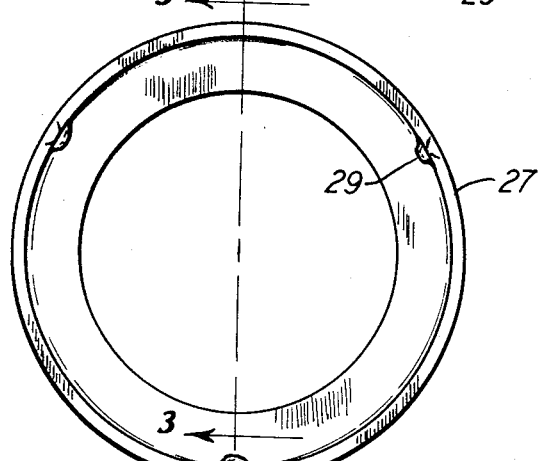
FIG. 2
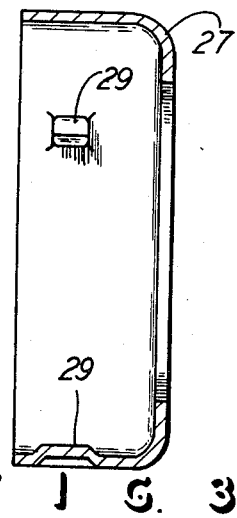
FIG. 3
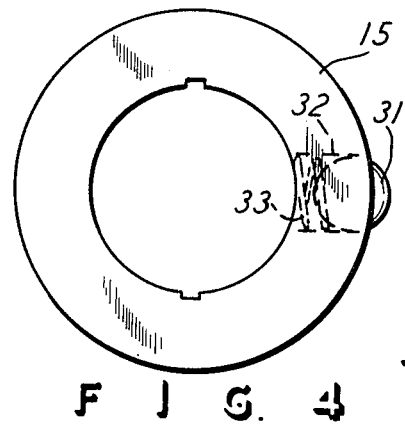
FIG. 4
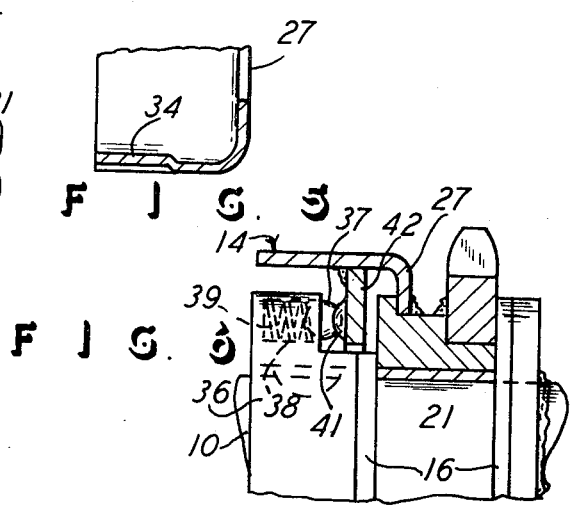
FIG. 5
FIG. 6

3,756,042

SLIP CLUTCH WITH SIGNAL

This invention relates to a slip clutch with a signal for revealing when the clutch is slipping, and the signal is an audible signal which is similar to a ringing bell.

BACKGROUND OF THE INVENTION

Slip clutches are commonly known and widely employed in transmitting rotational drive from a driving member to a driven member. These clutches are arranged such that when the force transmitted between the members is of a pre-determined amount, then the members no longer transmit a greater force, and they may even terminate transmitting any force, as the two members slip relative to each other and are no longer in full driving relationship. Further, prior art slip clutches commonly employ adjustable springs which permit the clutch to be adjusted to vary the amount of maximum force which can be transmitted up to the point when the clutch slips.

However, one deficiency and one area of concern with regard to prior art slip clutches is that related to informing the user that the clutch is actually at its maximum force condition and that the clutch is then slipping. Where a slip clutch does not have a signal to indicate that it is slipping, the clutch can be worn out or otherwise damaged by virtue of having the clutch continue to be subjected to its driving force though it is not operating in the manner which would permit it to transmit that force without slipping under conditions where two or more parts of the clutch are in frictional contact with each other and are thus abrading each other. Further, the prior art clutches can be visually observed to determine whether or not they are slipping, at least under certain clutch arrangements and conditions of operation and installation. However, such observing of course requires the attention of the operator, and this is undesirable in that he must then be distracted from paying attention to other activities.

Accordingly, it is a general object of this invention to provide a slip clutch with a signal which will reveal when the clutch is slipping.

A more specific object of this invention is to provide a slip clutch with an audible signal which will be detectable over the normal sound level of machinery operation, and which will also indicate the degree or speed of clutch slipping action.

Still further, it is a specific object of this invention to accomplish the aforementioned objectives and to overcome the aforementioned problems and to do so with a clutch which is simple in its structure, easily manufactured and maintained, and with a clutch which is fully capable of being installed in usual and conventional spaces and does not require special installation or a special large space or special accessories or additional equipment in the production of the signal and in the transmitting of the signal to the attention of the operator.

Still further, it is a specific object of this invention to provide a signal for a slip clutch, as mentioned above, and to do so with parts and an arrangement where the parts do not readily wear out and which do not damage each other though they are operationally related to each other and thus come into contact with each other. Further, in accomplishing this and other objects, the clutch and the parts thereof producing the signal are inexpensive and uncomplicated and they are therefore easily provided and are easily maintained and replaced, if necessary. Further, the signal itself does not require any power and therefore the clutch can operate at its full capacity.

Other objects and advantages of this invention will become apparent upon reading the following disclosure.

BRIEF DESCRIPTION OF THE DRAWINGS

FIG. 1 is a longitudinal sectional view through a preferred embodiment of this invention.

FIG. 2 is an end elevational view of one of the members shown in FIG. 1.

FIG. 3 is a sectional view taken along the line 3—3 of FIG. 2.

FIG. 4 is an end elevational view of another of the members shown in FIG. 1.

FIG. 5 is a sectional view of a fragment of a part similar to that shown in FIG. 3, but showing another embodiment of that part.

FIG. 6 is a fragment of a view similar to FIG. 1, but showing another embodiment of this invention.

DETAILED DESCRIPTION OF THE PREFERRED EMBODIMENTS

A shaft 10 has a circular plate 11 affixed thereto, such as by welding designated 12, and the shaft terminates in a threaded end 13. A first member, generally designated 14, and a second member 15 are mounted on the shaft 10, and these members are rotationally related to the shaft and to each other in manners hereinafter described. Friction discs 16 are also rotatably mounted on the shaft 10, and these discs are cylindrical and are of a friction material and they present flat faces on the opposite ends of the disc 16 to frictionally engage the respective members 14 and 15 and also the piece 11, as shown in FIG. 1. A compression spring 17 is piloted on the shaft 10 and is adjustable thereon by means of the nut 18 movable along the shaft threaded end 13. Thus the spring 17 is in end contact with nut 18, at one end of the spring, and the other end of the spring 17 is in end contact with the face 19 of the circular member 15. Thus the spring 17 forces the members 14 and 15 into frictional contact through the friction disc 16 which is disposed between the member 15 and the hub portion 21 of the member 14.

With the arrangement described thus far, and with the shaft 10 being driven and thereby driving the member 15 through the keys 22 interengaged between the shaft 10 and member 15, a sprocket 23 is driven through the friction disc 16. Thus, in that arrangement, the member 15 is the driving member while the member 14 is the driven member, and it will be understood that the member 14 has its hub 21 welded to the sprocket 23 by the weldment designated 24. Also, a bushing 26 rotatably supports the member 14 on the shaft 10.

The member 14 also includes a bell-shaped portion 27 which is secured to the hub 21 by the weldment designated 28. A dimple or indent 29 is incorporated in the portion 27, and FIGS. 2 and 3 show that the portion 27 is cylindrically and circularly shaped, and FIG. 1 shows that the cylindrical portion extends spaced from but radially in the plane of the member 15. Thus, the member 15 supports a sphere 31 which is freely supported on the member 15 through the cylindrical opening 32 which is a pocket in the member 15, as seen in FIGS.

1 and 4. Thus the sphere 31 is in the same plane transverse to the axis of the shaft 10 as is the location of the indent 29. Thus, the members 14 and 15 have respective projections 29 and 31 which are disposed in the same plane transverse to the axis of the shaft 10, and they are radially disposed relative to the axis of the shaft 10 to be in a position where the sphere 31 can hit the projection 29. Further, the portion 27 and the sphere 31 are preferably of metallic material such that when the two projections 29 and 31 hit against each other there is an audible signal in the nature of a ringing bell. Such hitting action occurs when the load on the clutch is of a predetermined amount or in excess thereof so that the member 14 is retarded in its rotation but the member 15 continues to rotate with the rotation of the shaft 10. Under those conditions, the sphere 31 is subjected to centrifugal force and is radially projected outwardly to be in the path of the projection 29 and thereby strike the projection 29. FIG. 2 shows that there may be a plurality of projections 29 spaced around the bell-shaped portion 27. It will therefore be understood that when the clutch commences to slip, the audible signal is produced and the operator will be informed that the clutch is slipping. In fact, depending on the degree of slip, that is whether or not there is any rotation to the member 14, the frequency of the sphere 31 striking the projections 29, and even the sound frequency created by the striking action can indicate the degree of slipping that is occurring.

If the driving and driven relationship of the members 14 and 15 were reversed from that just described, then a spring, such as the spring 33 could be disposed behind the sphere 31 to yieldingly urge the sphere 31 outwardly and into the path of the then rotating bell-shaped portion 27 which would be the driving portion of the clutch.

FIG. 5 shows a slightly different arrangement for the projections on the bell-shaped portion 27, and here the projection 34 is shown to extend to the outer edge of the member 27, rather than just be in the path of the sphere 31 as seen in FIG. 1. However, the operation and general arrangement is otherwise the same as shown in the other views in the drawings. Of course there are many installations where a slip clutch is employed, and one such installation is in connection with the drive of a lawnmower cutting reel, and the clutch in that instance would slip when the cutting reel would meet an object which would retard the rotation of the reel. At that time, the audible signal would be created because of the relative rotation between the members 14 and 15. It will be further apparent to one skilled in the art that the driving and driven members of the slip clutch could have the movable projection, such as the sphere 31, under the influence of a spring, such as the compression spring 33, and with the movable projection being movable parallel to the axis of rotation and with the other projections being spaced to the side of the movable projection, rather than radially spaced apart but instead being axially spaced from the sphere 31. Such word description should be apparent to one skilled in the art in view of the preceding description and the drawings, including that embodiment shown in FIG. 6 where the portion 15 is re-shaped to be as shown in the portion 36 in FIG. 6 for supporting a sphere 37 in an opening 38 which is a pocket. A compression spring 39 urges the sphere 37 axially of the rotatable member 10, and the sphere is therefore disposed in the rotational path of the projection 41 formed as a dimple on a washer-shaped plate 42 affixed to the bell portion 27. Thus, the projections 37 and 41 are disposed for hitting each other when the clutch is slipping, and this creates the audible signal.

What is claimed is:

1. A slip clutch with a signal for revealing when the clutch is slipping, comprising a rotatable driving member, a rotatable driven member rotationally engaged with said driving member until a pre-determined driving force therebetween is reached and whereupon said driving member rotates relative to said driven member, each of said members having an outer surface and with said surfaces being faced toward each other and spaced from each other, a projection on said surface of one of said members and extending toward the other of said surfaces for traversing a path of rotation in the space between said surfaces and upon rotation of said one member, the other of said members having a pocket extending into its said surface and having a limiting means in the depth of said pocket, a projection member movably disposed in said pocket and being movable therein against said limiting means and being supported therein to extend partly from said pocket and into said path of rotation of said projection on said one member for striking said projection when said members are rotating relative to each other, and with said projection member being related to said pocket to be restrained by said pocket for retracting from said projection upon striking said projection in creating the audible signal.

2. The slip clutch as claimed in claim 1, and wherein said limiting means is a spring disposed in said pocket and beneath said projection member.

3. The slip clutch as claimed in claim 1, and wherein said projection member is spherically shaped member.

4. The slip clutch as claimed in claim 3, and wherein said limiting means is a spring disposed in said pocket and beneath said spherically shaped member.

5. The slip clutch as claimed in claim 1, wherein said one of said members includes a cylindrically shaped portion and is of a metallic characteristic to produce a sound of a ringing bell when being struck by said projection member.

6. The slip clutch as claimed in claim 5, and wherein said projection on said one of said members is an indent in said cylindrically shaped portion, and said projection member on said other of said members is a spherically shaped member of a metallic characteristic.

7. A slip clutch with a signal for revealing when the clutch is slipping, comprising a rotatable driving member, a rotatable driven member rotationally engaged with said driving member until a pre-determined driving force therebetween is reached and whereupon said driving member rotates relative to said driven member, a projection on each of said members and disposed in the rotational paths of each other and being relatively movable toward and away from each other to hit each other during the relative rotation and to thereby create an audible signal, said projections being of metallic characteristic to produce a bell-ringing sound when creating the signal, one of said members being partly bell-shaped and encircles a portion of the other of said members, said projection on the encircled one of said members being a sphere movably supported on the latter said member to be under the influence of centrifugal force for radially outward movement to hit the other one of said projections.

8. The slip clutch as claimed in claim 7, wherein said projection on said one of said members is an indent in the bell shaped portion thereof.

* * * * *